US010645556B2

(12) United States Patent
Rittner (10) Patent No.: US 10,645,556 B2
(45) Date of Patent: May 5, 2020

(54) WIRELESS DATA TRANSMITTING DEVICE AND METHOD FOR WIRELESS DATA TRANSMISSION

(71) Applicant: Airbus Operations GmbH, Hamburg (DE)

(72) Inventor: Ulrich Rittner, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 0 days.

(21) Appl. No.: 15/378,704

(22) Filed: Dec. 14, 2016

(65) Prior Publication Data

US 2017/0180919 A1 Jun. 22, 2017

(30) Foreign Application Priority Data

Dec. 17, 2015 (DE) .................. 10 2015 225 563

(51) Int. Cl.
*H04W 4/80* (2018.01)
*H04W 4/029* (2018.01)
(Continued)

(52) U.S. Cl.
CPC .......... *H04W 4/80* (2018.02); *G06K 7/10178* (2013.01); *H02J 50/20* (2016.02); *H02J 50/80* (2016.02);
(Continued)

(58) Field of Classification Search
CPC ................. H04W 4/008; H04W 64/00; H04W 4/02–4/046; H04W 4/80; H04W 4/029;
(Continued)

(56) References Cited

U.S. PATENT DOCUMENTS 7,295,133 B1 * 11/2007 McCollough, Jr. ...... H04Q 9/00
324/126
2003/0104848 A1 6/2003 Bridgeglall
(Continued)

FOREIGN PATENT DOCUMENTS

WO 0195242 12/2001

OTHER PUBLICATIONS

Michael R Franceschini, Wireless Avionics Intra-Communications (WAIC) Overview and Applications, May 4, 2015, p. 15, available at https://www.isa.org/participate-in-a-technical-division/communications-division/wireless-avionics-intra-communications/ (Year: 2015).*

(Continued)

*Primary Examiner* — Gennadiy Tsvey
(74) *Attorney, Agent, or Firm* — Greer, Burns & Crain, Ltd.

(57) ABSTRACT

A wireless data transmitting device comprising a first antenna unit for receiving energy from an alternating electromagnetic field and for converting the energy into an alternating current energy signal and a rectifying unit for converting the alternating current energy signal into a direct current signal. The wireless data transmitting device further comprises a data transmitting unit configured to receive the direct current signal and to generate an aircraft related wireless data signal and a second antenna unit configured to output the aircraft related wireless data signal. Further, a system for wireless data transmission, an aircraft, and a method for wireless data transmission are presented.

20 Claims, 3 Drawing Sheets

(51) Int. Cl.
*H02J 50/80* (2016.01)
*H02J 50/20* (2016.01)
*H04B 5/00* (2006.01)
*G06K 7/10* (2006.01)
*H01Q 1/22* (2006.01)

(52) U.S. Cl.
CPC ......... *H04B 5/0031* (2013.01); *H04B 5/0037* (2013.01); *H04W 4/029* (2018.02); *H01Q 1/2225* (2013.01)

(58) Field of Classification Search
CPC ............... H04B 5/00–5/02; G01S 1/68; G06K 7/10158; H02J 50/20–80
See application file for complete search history.

(56) References Cited

U.S. PATENT DOCUMENTS

| | | | |
|---|---|---|---|
| 2005/0162396 A1* | 7/2005 | Meckesheimer | G09F 9/372 345/169 |
| 2007/0114280 A1 | 5/2007 | Coop et al. | |
| 2007/0266782 A1* | 11/2007 | Bartz | G06Q 10/087 73/156 |
| 2009/0067198 A1 | 3/2009 | Graham et al. | |
| 2010/0314445 A1* | 12/2010 | Kargl | G06K 7/0008 235/439 |
| 2011/0133891 A1 | 6/2011 | Krug et al. | |
| 2011/0210684 A1* | 9/2011 | Lanchava | F21V 21/096 315/312 |
| 2012/0256492 A1 | 10/2012 | Song et al. | |
| 2013/0217328 A1* | 8/2013 | Li | H04L 63/0492 455/41.1 |
| 2013/0225197 A1* | 8/2013 | McGregor | G01S 1/042 455/456.1 |
| 2013/0265155 A1* | 10/2013 | Wible | G06Q 10/08 340/539.13 |
| 2014/0008989 A1 | 1/2014 | Bommer et al. | |
| 2015/0222663 A1* | 8/2015 | Patange | H04B 5/0062 726/1 |
| 2015/0339948 A1* | 11/2015 | Wood | G06N 5/02 434/219 |
| 2016/0188919 A1* | 6/2016 | Gao | G06K 19/0709 340/10.34 |
| 2016/0266227 A1* | 9/2016 | Newman | G01S 1/68 |
| 2016/0347453 A1* | 12/2016 | Ayyagari | B64D 11/0015 |

OTHER PUBLICATIONS

European Search Report, dated Sep. 1, 2017, priority document.

* cited by examiner

WIRELESS DATA TRANSMITTING DEVICE AND METHOD FOR WIRELESS DATA TRANSMISSION

CROSS-REFERENCES TO RELATED APPLICATIONS

This application claims the benefit of the German patent application No. 10 2015 225 563.8 filed on Dec. 17, 2015, the entire disclosures of which are incorporated herein by way of reference.

TECHNICAL FIELD

The present disclosure relates to a technique for wireless data transmission. The technique may be embodied in one or more of devices, aircrafts, and methods.

BACKGROUND OF THE INVENTION

In aircraft cabins, the use of wireless radio technologies continuously increases. Wireless technologies may be used within the aircraft cabin, e.g., for communication within the aircraft or for in-flight entertainment systems. Further, on airports and within aircraft it might be necessary to keep track of certain items (like, e.g., baggage items, life vests, etc.) at the airport and/or within an aircraft. This technical field is generally known as "asset tracking." Further, in case a particular device of the aircraft is defective, it is desirable to obtain the location of this defective device as soon as possible in order to avoid expensive service and repair time.

Especially in the field of asset tracking, Radio-frequency identification (RFID) is a known technique. So-called RFID tags can be manufactured in a very cost-effective manner, e.g., in the form of RFID labels that can be attached to any kind of item to be tracked. In general, three different types of RFID tags are known: passive, active, or battery-assisted passive. A passive RFID tag typically comprises an antenna coil and a memory with information stored therein. An RFID reader generates an alternating electromagnetic field, from which the antenna coil of the passive RFID tag receives energy in order to power an integrated circuit of the RFID tag. Information stored in the memory of the RFID tag may thereby be read out and transmitted back to the RFID reader by changing the electrical loading the RFID tag represents. Thereby, the alternating electromagnetic field is modified and this modification can be read out by the RFID reader in order to obtain the desired information from the RFID tag. However, for receiving the data from the RFID tag, a special RFID reader is necessary and the RFID tags can only transmit small amounts of data over a very short range.

Further, active and battery-assisted passive RFID tags require an energy source, e.g., in the form of a battery or an external power supply, which makes them inflexible, bulky, and/or expensive.

Further, so-called beacons are known, which can transmit a wireless data signal under the Bluetooth® low energy (BLE) technology (also known as Bluetooth® Smart), which is part of the Bluetooth 4.0 standard. However, these BLE beacons require an external energy source or an internal energy source, like a battery. Therefore, BLE beacons are bulky, expensive, and have a limited life time.

SUMMARY OF THE INVENTION

It is therefore an object of the present disclosure to provide a technique for wireless data transmission, which avoids one or more of the drawbacks discussed above, or other related problems.

According to a first aspect, a wireless data transmitting device is presented. The wireless data transmitting device comprises a first antenna unit for receiving energy from an alternating electromagnetic field and for converting the energy into an alternating current energy signal and a rectifying unit for converting the alternating current energy signal into a direct current signal. The wireless data transmitting device further comprises a data transmitting unit configured to receive the direct current signal and to generate an aircraft related wireless data signal and a second antenna unit configured to output the aircraft related wireless data signal.

The wireless data transmitting device may be provided in the form of a tag (e.g., a sticker), which is configured to be attached to an item to be tracked. The wireless data transmitting device may, e.g., comprise no battery or any other external energy reception interface besides the first antenna unit. In other words, the wireless data transmitting device may represent a passive tag and, in particular, a passive Bluetooth low energy (BLE) tag. The first antenna unit may comprise at least one of a loop antenna and a coil antenna. The first antenna unit may be configured to couple to a magnetic field component of the alternating electromagnetic field. The rectifying unit may comprise at least one diode. In particular, the rectifying unit may comprise a diode assembly configured to rectify the alternating current (AC) energy signal into the direct current (DC) signal. The rectifying unit may comprise further electrical components, e.g., for converting a first voltage of the alternating current energy signal into a second voltage of the direct current signal.

Further, the rectifying unit or the data transmitting unit may comprise an energy storing unit for storing the energy provided from the first antenna unit. The energy storing unit may comprise at least one of a battery and a capacitor. For example, the energy storing unit may be provided as part of the rectifying unit, wherein the energy storing unit is configured to output the direct current signal. Further, the energy storing unit may be provided as part of the data transmitting unit, wherein the energy storing unit is configured to receive the direct current signal and to output a further direct current signal. Further, an energy storing unit may be provided between the rectifying unit and the data transmitting unit. The energy storing unit may be configured to accumulate energy received via the first antenna unit and to output the energy in form of a direct current signal for powering the data transmitting unit.

The data transmitting unit may comprise an integrated circuit, which is powered by the direct current signal. The wireless data signal may comprise information indicative of an identifier (ID) and/or a location of the wireless data transmitting device. The wireless data transmitting device may be configured to output the wireless data signal in response to receiving energy from the alternating electromagnetic field. Further, the wireless data transmitting device may be configured to output the wireless data signal in certain time intervals. Further, the alternating electromagnetic field may comprise a predefined trigger signal and the data transmitting unit may be configured to output the wireless data signal in response to the trigger signal. Further, the data transmitting unit may be configured to select a wireless data signal from a plurality of wireless data signals based on an information signal provided with the alternating electromagnetic field.

The wireless data signal may be a Bluetooth low energy data signal. The data signal may have a frequency of substantially 2.4 GHz within the Bluetooth low energy specification. In particular, the data signal may be compatible with the Bluetooth 4.0 standard.

The wireless energy signal may have a frequency chosen from the list of 868 MHz, 915 MHz, 13 MHz, and 4.2 GHz. Therefore, the wireless energy signal may have a frequency typically used for RFID applications. The wireless energy signal may be transmitted by an RFID reader. Further, the wireless energy signal may be a frequency within the WAIC (Wireless Avionics Intra-Communications) standard. In particular, the wireless energy signal may have a frequency of substantially 4.2 GHz within the WAIC standard.

The wireless data transmitting device may further comprise a memory unit for outputting data stored therein, wherein the data transmitting unit is configured to receive the data stored in the memory unit and wherein the wireless data signal is indicative of the data stored in the memory unit.

The memory unit may comprise a rewritable and/or a non-rewritable memory unit. The memory unit may comprise, e.g., a solid state memory unit. Energy necessary for operating the memory unit may be provided by the direct current signal. For example, the data stored in the memory unit may be indicative of at least one of an identifier (ID) of the wireless data transmitting device, a location of the wireless data transmitting device (e.g., a location within an aircraft), a web address (e.g., an HTTP hyperlink), a data sheet, and a repair manual. In particular, the data stored in the memory unit may comprise a repair manual for a device, to which the wireless data transmitting device is attached and/or a web address, under which a repair manual for a device to which the wireless data transmitting device is attached can be received.

The wireless data transmitting device may further comprise a Radio-frequency identification, RFID, unit configured to receive energy from the alternating electromagnetic field, to be powered by the received energy, and to wirelessly transmit predefined data. For receiving the energy from the alternating electromagnetic field, the RFID unit may comprise a third antenna unit separate from the first and second antenna units. Alternatively, the RFID unit may receive energy from the first antenna unit of the wireless data transmitting device. The RFID unit may comprise a further rectifying unit for converting a received alternating current energy signal into a direct current signal. Alternatively, the RFID unit may be powered by the direct current signal from the rectifying unit of the wireless data transmitting device. Further, the RFID unit may comprise a further memory unit for outputting data stored therein. The RFID unit may be supplied with data stored in a memory unit of the wireless data transmitting device. The RFID unit may be configured to wirelessly transmit the predefined data back to a field generating device generating the alternating electromagnetic field. For example, the RFID unit may be configured to change a load and to thereby influence the alternating electromagnetic field, such that a field generating device generating the alternating electromagnetic field can receive the predefined data.

The wireless data signal may be indicative of a location of the wireless data transmitting device. For example, the wireless data signal may comprise coordinates in a predefined coordinate system. For example, the location may be a location within an aircraft. In this case, the location may be indicated by a row number and/or a seat number of a seat within the aircraft. Further, the wireless data signal may comprise GPS coordinates indicative of the location of the wireless data transmitting device.

According to a second aspect, a system for wireless data transmission is provided. The system comprises a wireless data transmitting device according to the present disclosure. The system further comprises a field generating device for generating the alternating electromagnetic field and a mobile user device configured to receive the wireless data signal. According to the second aspect, the wireless data signal comprises information indicative of a location of the wireless data transmitting device and the mobile user device is configured to display a map indicating the location of the wireless data transmitting device.

The system may comprise a plurality of wireless data transmitting devices according to the present disclosure. For example, a plurality of wireless data transmitting devices may be located at different locations within an aircraft. The plurality of wireless data transmitting devices may be provided, e.g., behind an interior trim of the aircraft. The field generating device may comprise an antenna for generating the alternating electromagnetic field. The field generating device may comprise an internal energy source (e.g., a battery) or an interface for external energy supply (e.g., interface to a board power supply of an aircraft). The mobile user device may be, e.g., a smartphone or a tablet PC. The mobile user device may be configured to receive a Bluetooth low energy data signal transmitted by the second antenna unit of the wireless data transmitting device. The mobile user device may comprise a Bluetooth low energy receiving unit for receiving wireless data signals within the Bluetooth low energy standard. The information indicative of a location of the wireless data transmitting device may comprise, e.g., coordinate data in relation to the map. Further, the wireless data signal may comprise a data set suitable for generating the map.

According to a third aspect, an aircraft is presented. The aircraft comprises at least one wireless data transmitting device according to the present disclosure and at least one field generating device for generating the alternating electromagnetic field. For example, a plurality of wireless data transmitting devices may be located at different locations of the aircraft. Further, a plurality of field generating devices may be provided at different locations of the aircraft. For example, each wireless data transmitting device may be located at a position related to a device of the aircraft, that might become defective. A number of field generating devices may be smaller than a number of wireless data transmitting devices within the aircraft. Further, at least one wireless data transmitting device may be located in a passenger cabin of the aircraft, within a cargo compartment of the aircraft, and/or at an outside of the aircraft.

The field generating device may be fixed to the aircraft and configured to be powered by a board power supply of the aircraft. For example, a plurality of field generating devices may be provided at the aircraft, wherein the field generating devices are distributed at different locations of the aircraft.

According to a fourth aspect, a method for wireless data transmission is presented. The method comprises receiving energy from an alternating electromagnetic field, converting the energy into an alternating current energy signal, and converting the alternating current energy signal into a direct current signal. The method further comprises supplying a data transmitting unit with the direct current signal, generating, by the data transmitting unit, an aircraft related wireless data signal, and outputting the aircraft related wireless data signal.

The method may be carried out by a wireless data transmitting device according to the present disclosure.

The alternating electromagnetic field may be generated by a field generating device fixed to an aircraft and powered by a board power supply of the aircraft.

The alternating electromagnetic field may be generated by a portable field generating device. The portable field generating device may be configured to output the electromagnetic field at a frequency and field strength within the WAIC standard.

The portable field generating device may be a portable Radio-frequency identification, RFID, reader. The portable field generating device may be configured to generate an alternating electromagnetic field which is configured to power a passive RFID tag.

The wireless data signal may comprise information indicative of a location of the wireless data transmitting device. The method may further comprise receiving, by a mobile user device, the wireless data signal and displaying, on a screen of the mobile user device, a map indicating the location of the wireless data transmitting device.

Even if some of the aspects described above have been described in relation to an aircraft, these aspects can also be implemented in any other aircraft related field. For example, wireless data transmitting devices according to the present disclosure may be attached to items at fixed positions of an airport and/or to items which are moved at the airport and/or in an aircraft, e.g., to luggage items, life vests, oxygen masks, fire extinguisher, etc. Further, the aspects can also be implemented as a method or as a computer program executing the method.

BRIEF DESCRIPTION OF THE DRAWINGS

Embodiments of the technique presented herein are described below with reference to the accompanying drawings, in which.

DETAILED DESCRIPTION OF THE PREFERRED EMBODIMENTS

Figure 1:
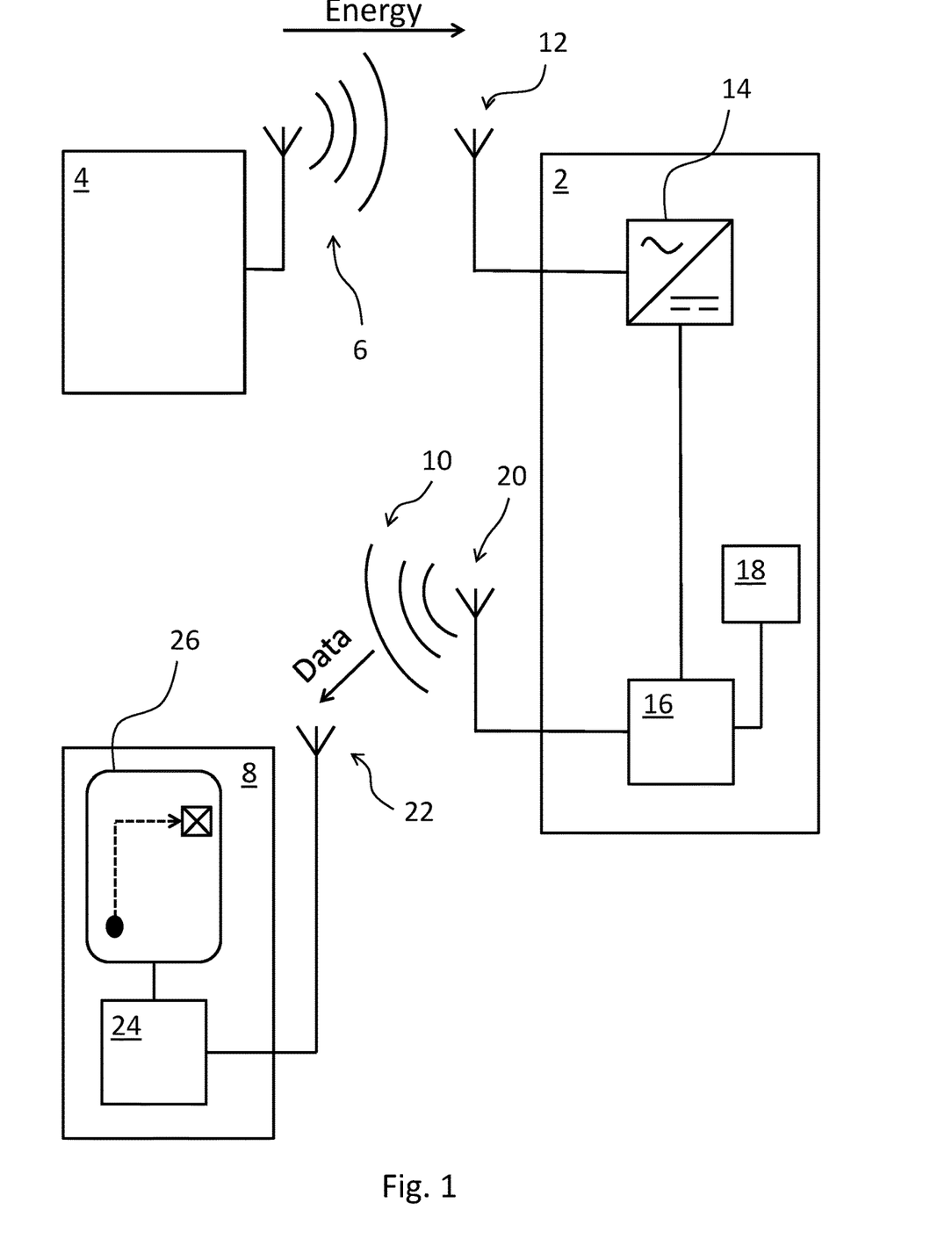
FIG. 1 shows a schematic representation of an embodiment, in which the wireless data transmitting device comprises a memory unit.
Figure 2:
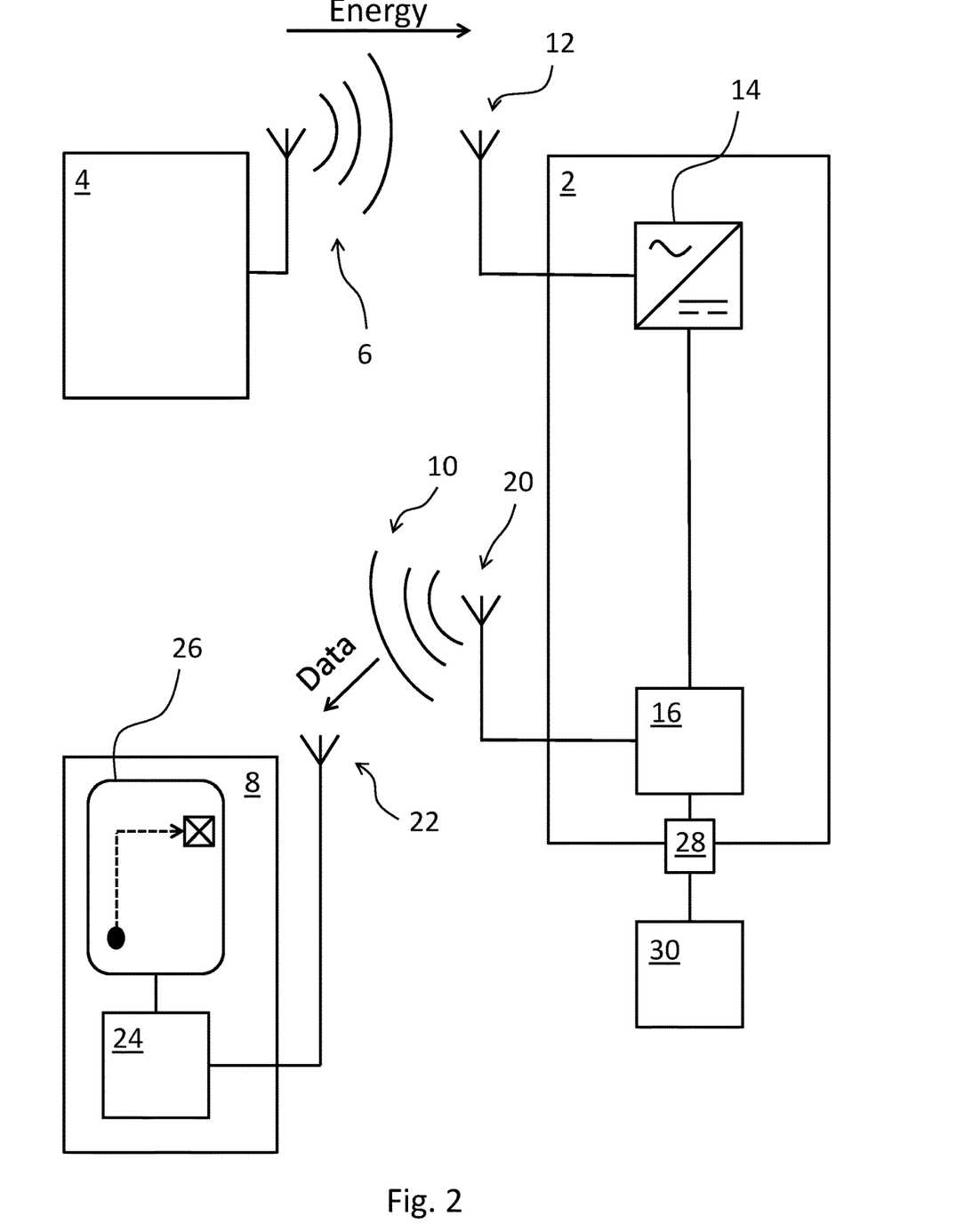
FIG. 2 shows a schematic representation of an embodiment in which the wireless data transmitting device comprises a data input interface.

In the following, but without limitation thereto, specific details are expounded in order to give a full understanding of the present disclosure. It is clear to persons skilled in the art, however, that the present invention can be used in other embodiments, which can differ from the details expounded in the following. For example, the embodiments shown in FIGS. 1 to 3 can be arbitrarily combined with each other. For example, a wireless data transmitting device according to the present disclosure may comprise a memory unit as shown in FIG. 1 and a data input interface as shown in FIG. 2. Further, the same reference signs will be used in the following for describing the same units. Details given with regard to a particular unit of a particular embodiment also apply to the same unit of the other embodiments, if possible.

It is clear to persons skilled in the art that the explanations expounded in the following are/can be implemented through the use of hardware circuits, software means or a combination thereof. The software means can be associated with programmed microprocessors or a general computer, an ASIC (Application Specific Integrated Circuit) and/or DSPs (Digital Signal Processors).

FIG. 1 shows an embodiment of a data transmitting device 2 according to the present disclosure. FIG. 1 further shows a field generating device 4 for generating an alternating electromagnetic field 6. Further, FIG. 1 shows a mobile user device 8 configured to receive a wireless data signal 10 emitted by the wireless data transmitting device 2. The wireless data transmitting device 2, the field generating device 4, and the mobile user device 8 represent an example of a system for wireless data transmission according to the present disclosure. As explained below, the system may comprise a plurality of wireless data transmitting devices 2, a plurality of field generating devices 4, and/or a plurality of mobile user devices 8.

The alternating electromagnetic field 6 generated by the field generating device 4 may have a frequency in a frequency band typically used for Radio-frequency identification (RFID). For example, the alternating electromagnetic field 6 may have a frequency in the range of 125 to 134 kHz, a frequency of 13.56 MHz, or a frequency in the range of 860 to 960 MHz. Possible standards for the alternating electromagnetic field are, for example, ISO 11784/5, ISO 14223, ISO 18000-2, ISO 15693, ISO 14443, ISO 18000-3, and/or ISO 18000-6. Further, the alternating electromagnetic field 6 may have a frequency of 4.2 GHz under the WAIC standard.

The wireless data transmitting device 2 comprises a first antenna unit 12 for receiving energy from the alternating electromagnetic field 6 emitted by the field generating device 4. The first antenna unit 12 may be a loop antenna or a coil antenna, which couples to a magnetic field component of the alternating electromagnetic field 6. Depending on a field strength of the alternating electromagnetic field 6, the alternating electromagnetic field 6 and, in particular, its magnetic field component transports energy, which is received by the first antenna unit 12 via induction. The first antenna unit 12 converts the wirelessly received energy into an alternating current (AC) energy signal. The alternating current energy signal has substantially the same frequency as the alternating electromagnetic field 6. The alternating current energy signal is directed into a rectifying unit 14 of the wireless data transmitting device 2. The rectifying unit 14 rectifies the incoming alternating current (AC) energy signal into a direct current (DC) signal. In other words, the rectifying unit 14 converts the alternating current (AC) energy signal into a direct current (DC) signal. The direct current signal has a substantially stable voltage, wherein it should be appreciated by the skilled person that the direct current signal does not need to be a perfect DC signal. It is only necessary that the DC signal can power the data transmitting unit 16 described below. The rectifying unit 14 may comprise at least one diode and, e.g., a known diode assembly may be used for rectifying the incoming AC energy signal.

The DC signal generated by the rectifying unit 14 is directed to the data transmitting unit 16, which is powered by the DC signal. The rectifying unit 14 may comprise an energy storing unit (not shown) configured to store the energy received by the first antenna unit 12. Thereby, the energy storing unit may accumulate a predefined amount of energy, which can be transmitted to the data transmitting unit 16 via the DC signal. The energy storing unit may comprise, e.g., a battery and/or a capacitor. Additionally or alternatively, a similar energy storing unit may be provided as part of the data transmitting unit 16 or in between the rectifying unit 14 and the data transmitting unit 16. The energy storing unit may be configured such that it accumulates a predefined amount of energy, which is sufficient for powering the data transmitting unit 16 for a predefined action, e.g., for outputting a predefined number of aircraft related wireless data signals 10. Thereby, the wireless data transmitting device 2 waits until enough energy is accumulated and then transmits a predefined number of wireless data signals 10 (e.g., one or more).

The data transmitting unit 16 receives the DC signal and is powered by the DC signal. For example, the data transmitting unit 16 requires a particular amount of energy in order to function. This energy is provided via the DC signal. The data transmitting unit 16 may comprise an integrated circuit and may comprise, e.g., a processor or another type of control unit. Further, in the embodiment shown in FIG. 1, a memory unit 18 is provided as part of the wireless data transmitting device 2. The memory unit 18 is connected to the data transmitting unit 16, such that the data transmitting unit 16 may receive data stored in the memory unit 18. The data transmitting unit 16 may receive data from the memory unit 18 and generate an aircraft related wireless data signal 10 based on the information received from the memory unit 18. For example, the generated aircraft related wireless data signal 10 may comprise the information received from the memory unit 18.

As will be described below in more detail, information transmitted in the aircraft related wireless data signal 10 is directed to information in relation to an aircraft. For example, an identifier (ID) may be stored in the memory unit 18 and the identifier is transmitted via the aircraft related wireless data signal 10. Based on the ID, it can be decided, for example, at which location within an aircraft the wireless data transmitting device 2 is located. Further examples will be given below.

The wireless data transmitting device 2 comprises a second antenna unit 20 configured to output the aircraft related wireless data signal 10. The second antenna unit 20 is connected to the data transmitting unit 16.

The data transmitting unit 16 and the second antenna unit 20 may be configured to transmit the wireless data signal 10 within the Bluetooth® low energy standard (Bluetooth LE, BLE, marketed as Bluetooth Smart). In the following, Bluetooth Smart will be used as a synonym for Bluetooth low energy. Bluetooth Smart was originally introduced under the name Wibree by Nokia in 2006. It was merged into the main Bluetooth standard in 2010 with the adoption of the Bluetooth Core Specification Version 4.0. Therefore, the wireless data signal 10 may be a wireless signal within the Bluetooth 4.0 specification. In particular, the wireless data signal 10 may be a wireless signal within the Bluetooth 4.0 specification of 30 Jun. 2010. In other words, the wireless data signal 10 may be a Bluetooth low energy data signal. The wireless data signal may be compatible with the Bluetooth 4.0 standard, but also with following Bluetooth standards, such as Bluetooth 4.1 and Bluetooth 4.2, for example. The wireless data signal 10 may have a frequency of 2.4 GHz.

The wireless data signal 10 may be a wireless signal which can be received by a corresponding mobile device antenna unit 22. The mobile device antenna unit 22 may be configured to receive Bluetooth low energy data signals within the Bluetooth 4.0 specification. The mobile user device 8 is configured to receive the wireless data signal 10 via the mobile device antenna unit 22. For example, the mobile user device 8 may be a smartphone capable of receiving wireless signals within the Bluetooth low energy standard (i.e., within the Bluetooth 4.0 specification). The wireless user device 8 comprises a control unit 24 configured to receive the aircraft related wireless data signal 10 and configured to process the wireless data signal 10. For example, the control unit 24 may comprise a Bluetooth low energy receiving unit. Further, the control unit 24 may also have transmitting capabilities for transmitting a further data signal via the mobile user device antenna unit 22. For example, the mobile user device 8 may be configured to transmit a further Bluetooth low energy data signal.

In the embodiment shown in FIG. 1, the mobile user device 8 comprises a display unit 26. The display unit 26 is configured to display information in relation with the received aircraft related wireless data signal 10. In particular, the display unit 26 may display information received with the aircraft related wireless data signal 10. In one embodiment, the aircraft related wireless data signal 10 comprises information indicative of a location of the wireless data transmitting device 2. The information may be, e.g., indicative of a location of the wireless data transmitting device 2 within an aircraft. The mobile user device 8 is configured to receive the information regarding the location of the wireless data transmitting device 2 and displays a map indicating the location of the wireless data transmitting device 2 on its display device 26. Thereby, a user of the mobile user device 8 can easily find a way to the wireless data transmitting device 2, for example, within an aircraft.

In the following, one particular embodiment will be described, how the system described above and other systems described herein may be used for locating a particular item (e.g., a defective device) within an aircraft. A plurality of wireless data transmitting devices 2 is attached to different devices of the aircraft, e.g., within the aircraft cabin. Further, the wireless data transmitting devices 2 may be located in the vicinity of the respective devices, e.g., behind an interior trim of the aircraft. In case one of the devices is defective, a corresponding wireless data transmitting device 2 is informed about the defective state of the device and, e.g., a corresponding information may be written into the memory unit 18 of the respective wireless data transmitting device 2. Additionally or alternatively, a mobile user device 8 is directly informed about an ID of a defective device and/or an ID of a corresponding wireless data transmitting device 2.

Further, at least one field generating device 4 is positioned within the aircraft. For example, three field generating devices 4 may be distributed at different locations of the aircraft. The field generating device 4 or the field generating devices 4 are configured to generate an alternating electromagnetic field 6. The alternating electromagnetic field 6 may have a frequency of substantially 4.2 GHz within the WAIC specification. Further, typical RFID frequencies may be used for the alternating electromagnetic field 6.

The field generating devices 4 are positioned such that each wireless data transmitting device 2 is within reach of one of the field generating devices 4, such that each wireless data transmitting device 2 can receive enough energy from the alternating electromagnetic field 6 for powering its corresponding data transmitting unit 16. The field generating devices 4 may be configured to constantly generate the alternating electromagnetic field 6, to generate the alternating electromagnetic field 6 at predefined time intervals, or to generate the alternating electromagnetic field 6 in response to receiving a trigger signal.

The wireless data transmitting device 2 of the defective device receives energy from the alternating electromagnetic field 6 and generates an aircraft related wireless data signal 10, which comprises information indicative of the location of the respective wireless data transmitting device 2. The mobile user device 8 receives this information and displays the information on its display unit 26. For example, a map can be displayed on the display unit 26 indicating the location of the respective wireless data transmitting device 2.

In one example, the wireless data transmitting device 2 transmits data regarding a data sheet and/or a repair manual for the corresponding defective device to the mobile user device 8. Further, the wireless data transmitting device 2 can transmit an aircraft related wireless data signal 10 comprising information with regard to a web address, from which predefined information can be received. The predefined information can be, e.g., a data sheet and/or a repair manual of the respective defective device. For example, the aircraft related wireless data signal 10 may comprise information according to the "Eddystone" protocol. This information may directly access a browser of the mobile user device 8, e.g., to open a predefined web address. Therefore, no special applications are necessary on the mobile user device 8 and a web browser having respective capabilities (e.g., Eddystone capability) is sufficient.

With the introduction of the Eddystone protocol for BLE modules by Google® it is possible to directly integrate the BLE modules (for example the wireless data transmitting device 2) including the Beacon protocol directly into the browser (e.g., Google Chrome®). Thereby, no special app is necessary for the respective mobile user device 8 (e.g., a smartphone running an Android or iOS operating system). The browser can directly communicate with such Eddystone Beacons, i.e., wireless data transmitting devices 2 having Eddystone capabilities. Thereby, direct web addresses can be provided to the browser, such that the wireless data transmitting device 2 can directly "access" a website in the browser of the mobile user device 8. This website can be, e.g., a website or server address, where a repair manual for a maintenance technician (a user of the mobile user device 8) is deposited. Thus, the user of the mobile user device 8 can exactly locate the defective device and quickly replace it.

By using the technique described herein, a wireless data transmitting device 2, as well as a defective device in relation with the wireless data transmitting device 2 can be easily and quickly located by using, for example, a standard smartphone as mobile user device 8. Further, the wireless data transmitting devices 2 can be flexibly distributed, e.g., within an aircraft, since they do not require an external energy source. Further, a life time of the wireless data transmitting devices 2 is improved since they do not require a battery having a limited capacity.

In view of the above, a cost effective and flexible technology is presented, how a defective device may be located within an aircraft.

The technique described herein may further be used for locating items other than defective devices within and outside of an aircraft, e.g., at an airport.

FIG. 2 shows another embodiment according to the present disclosure, wherein elements already described with regard to the embodiment of FIG. 1 fulfil the same functions and/or purpose. The wireless data transmitting device 2 shown in FIG. 2 comprises a data input interface 28 configured to receive aircraft related data. The data input interface 28 may receive the aircraft related data from an external device 30. The external device 30 may be a device, which has a certain risk of becoming a defective device. Further, the external device 30 may be configured to transmit device information regarding BITE and/or data like, e.g., a voltage, a current, and/or a temperature of the external device 30 or a further device connected to the external device 30. Further, the external device 30 may comprise a sensor for measuring at least one of temperature, smoke, gas, pressure, video, audio, CO2, noise. In this case, the external device 30 is configured to transmit respective data indicating the measured or sensed properties to the data input interface 28. Respective data can then be transmitted by the data transmitting unit 16 via the second antenna unit 20 within the aircraft related wireless data signal 10.

In a further embodiment, which is not explicitly shown in the figures, the wireless data transmitting device 2 may comprise a memory unit 18 and a data input interface 28. In that case, data may be received, e.g., via the data input interface 28 and stored in the memory unit 18. Further, the data transmitting unit 16 may choose, whether it generates an aircraft related wireless data signal 10 based on information stored in the memory 18 or based on information received via the data input interface 28.

Figure 3:
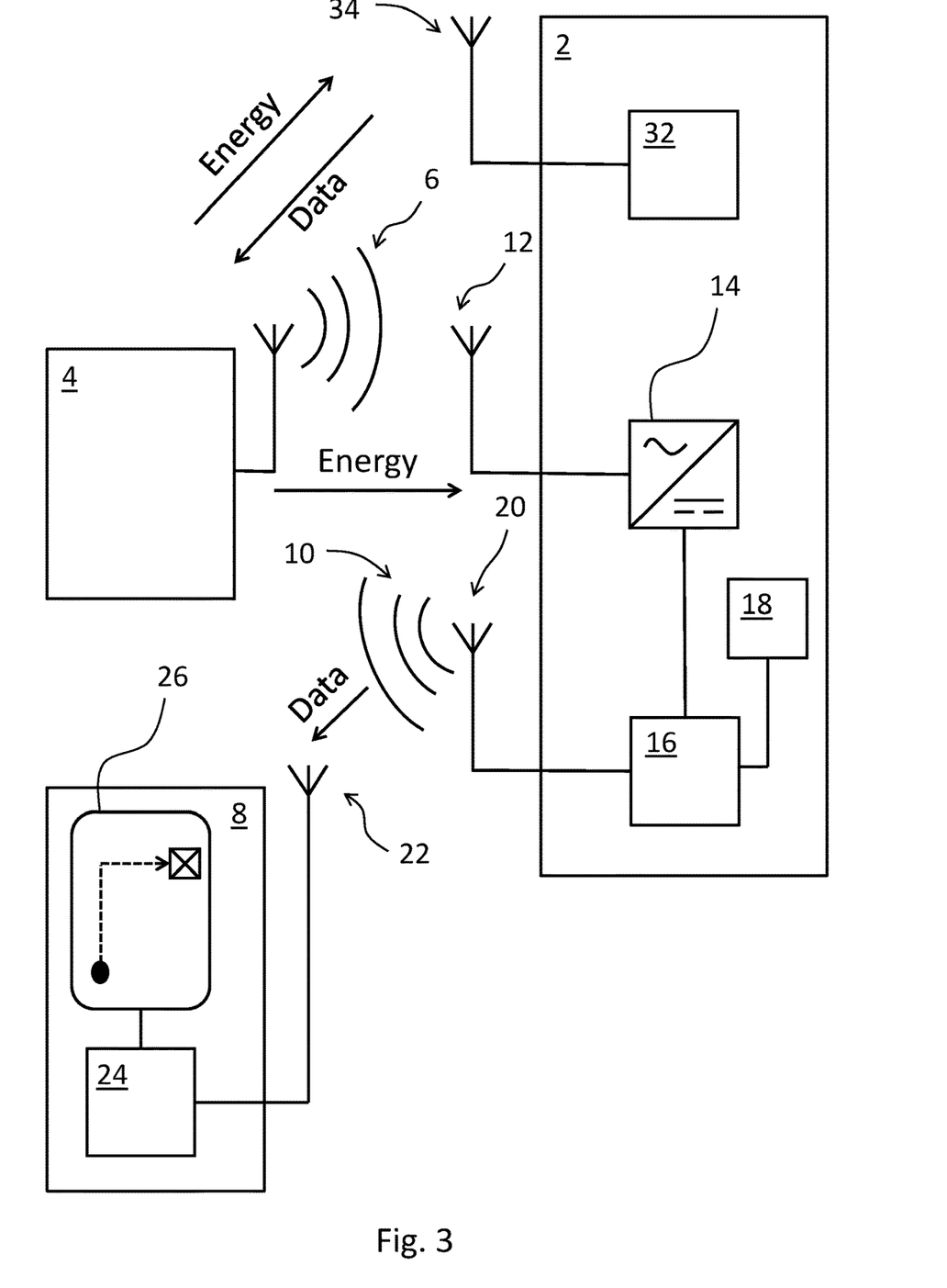
FIG. 3 shows a schematic representation of an embodiment in which the wireless data transmitting device comprises an RFID unit.

FIG. 3 shows an embodiment, in which elements already described with regard to FIG. 1 or FIG. 2 have the same functionalities and/or purpose. The wireless data transmitting device 2 of the embodiment shown in FIG. 3 further comprises a Radio-frequency identification, RFID, unit 32 configured to receive energy from the alternating electromagnetic field 6, to be powered by the received energy, and to wirelessly transmit predefined data. Therefore, the RFID unit 32 may comprise a third antenna unit 34. Alternatively, the RFID unit 32 may use one of the first antenna unit 12 or the second antenna unit 20. The RFID unit 32 may comprise, e.g., a further memory unit or the RFID unit 32 may be configured to receive and/or transmit information from and/or to the memory unit 18 of the wireless data transmitting device 2.

By providing an additional RFID unit 32, the RFID unit 32 may communicate, e.g., with the field generating device 4. The field generating device 4 may be, in all described embodiments, a portable RFID reader. Additionally or alternatively, at least one field generating device 4 may be provided, which is fixed to an aircraft (e.g., to an inner wall of an aircraft cabin) and which receives energy from a board power supply of the aircraft. For example, the RFID unit 32 may transmit data to the field generating device 4. Further, the RFID unit 32 may not only receive energy, but also data from the field generating device 4.

Although in the embodiments described before, a data communication has only been described from the wireless data transmitting device 2 to the mobile user device 8, in other embodiments, the mobile user device 8 can also transmit data to the wireless data transmitting device 2, e.g., for writing data into the memory unit 18 or for configuring the data transmitting unit 16.

Although the embodiments described before have been described mainly in relation to detecting a defective device within an aircraft, the presented technique may also be used in other aircraft related fields, such as detecting defective devices or other items at an airport. Further, the technique may be used for asset tracking within an aircraft or within an airport.

Embodiments of the technique described herein present a passive Bluetooth low energy (BLE) module for applications in localization asset tracking, maintenance with easy connection to available mobile user devices, such as smartphones. This module is charged either by a charging part of a commercially available RFID reader or by specific charging electronics, e.g., at the worldwide standardized WAIC frequency at 4.2 GHz. Thus, the described BLE module becomes a "passive BLE tag" and benefits from the easy connectivity to smartphones, e.g., via Bluetooth 4.0.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for wireless data transmission, comprising:
   a wireless data transmitting device, wherein the wireless data transmitting device comprises no battery, the wireless data transmitting device comprising:
      a first antenna unit configured to be the only external energy reception interface and to receive energy from an alternating electromagnetic field and to convert the energy into an alternating current energy signal;
      a rectifying unit configured to convert the alternating current energy signal into a direct current signal;
      a data transmitting unit directly connected to the rectifying unit and configured to be powered by the direct current signal, and configured to receive the direct current signal and to generate an aircraft related wireless data signal, wherein the wireless data signal comprises information indicative of an identifier and a location of the wireless data transmitting device within an aircraft, wherein the location comprises GPS coordinates; and
      a second antenna unit configured to output the aircraft related wireless data signal; and
   a plurality of field generating devices configured to generate the alternating electromagnetic field, each of the plurality of field generating devices comprising an RFID reader,
   wherein the field generating devices are disposed in different locations of the aircraft and configured to be powered by a board power supply of the aircraft,
   wherein the wireless data transmitting device is provided in a form of a tag that is configured to be attached to an item to be tracked within the aircraft.

2. The system according to claim 1, wherein the wireless data signal is a Bluetooth low energy data signal.

3. The system according to claim 1,
   wherein the wireless data transmitting device further comprises:
      a memory unit configured to output data stored therein, and
   wherein the data transmitting unit is configured to receive the data stored in the memory unit and wherein the wireless data signal is indicative of the data stored in the memory unit.

4. The system according to claim 1,
   wherein the wireless data transmitting device further comprises:
      a data input interface configured to receive aircraft related data from an external device comprising a sensor, wherein the aircraft related data comprises data indicating measured or sensed properties from the sensor, and
   wherein the data transmitting unit is configured to receive the aircraft related data from the data input interface and wherein the wireless data signal is indicative of the aircraft related data received at the data input interface.

5. The system according to claim 1,
   wherein the wireless data transmitting device further comprises a Radio-frequency identification (RFID) unit configured to receive energy from the alternating electromagnetic field, to be powered by the received energy, and to wirelessly transmit predefined data.

6. An aircraft comprising the system of claim 1.

7. The aircraft according to claim 6, wherein the field generating devices are fixed to the aircraft.

8. The system according to claim 1, wherein the alternating electromagnetic field has a frequency selected from the group consisting of 868 MHz, 915 MHz, 13 MHz, and 4.2 GHz.

9. The system according to claim 1, wherein the alternating electromagnetic field has a frequency of substantially 4.2 GHz.

10. The system according to claim 1, wherein the tag is a sticker.

11. The system according to claim 1, wherein the location of the wireless transmitting device comprises a row number and/or a seat number of a seat within the aircraft.

12. The system according to claim 1, wherein the wireless data signal further comprises a web or server address.

13. The system according to claim 1,
    wherein the plurality of wireless data transmitting devices are provided in separate rooms of the aircraft or separated by barriers in the aircraft.

14. The system according to claim 13,
    wherein at least one of the plurality of wireless data transmitting devices is disposed outside of the aircraft.

15. A system for wireless data transmission, comprising:
    at least one wireless data transmitting device, wherein the at least one wireless data transmitting device comprises no battery, the at least one wireless data transmitting device comprising:
       a first antenna unit configured to be the only external energy reception interface and to receive energy from an alternating electromagnetic field and to convert the energy into an alternating current energy signal;
       a rectifying unit configured to convert the alternating current energy signal into a direct current signal;
       a data transmitting unit directly connected to the rectifying unit and configured to be powered by the direct current signal, and configured to receive the direct current signal and to generate an aircraft related wireless data signal, wherein the wireless data signal comprises information indicative of an identifier and a location of the wireless data transmitting device within an aircraft, wherein the location comprises GPS coordinates, and wherein the wireless data transmitting device is provided in a form of a tag that is configured to be attached to an item to be tracked within the aircraft; and
       a second antenna unit configured to output the aircraft related wireless data signal;
    a plurality of field generating devices configured to generate the alternating electromagnetic field, each of the plurality of field generating devices comprising an RFID reader, wherein the field generating devices are disposed in different locations of the aircraft and configured to be powered by a board power supply of the aircraft; and a mobile user device configured to receive the wireless data signal; and the mobile user device is configured to display a map indicating the location of the wireless data transmitting device.

16. The system according to claim 15, wherein the alternating electromagnetic field has a frequency of substantially 4.2 GHz.

17. The system according to claim 15, wherein the tag is a sticker.

18. The system according to claim 15, wherein the location of the wireless transmitting device comprises a row number and/or a seat number of a seat within the aircraft.

19. The system according to claim 15, wherein the wireless data signal further comprises a web or server address.

20. The system according to claim 15,
wherein the at least one wireless data transmitting device further comprises:
a data input interface configured to receive aircraft related data from an external device comprising a sensor, wherein the aircraft related data comprises data indicating measured or sensed properties from the sensor, and wherein
the data transmitting unit is configured to receive the aircraft related data from the data input interface and wherein the wireless data signal is indicative of the aircraft related data received at the data input interface.

* * * * *